(12) United States Patent
Akremi et al.

(10) Patent No.: US 12,222,053 B2
(45) Date of Patent: Feb. 11, 2025

(54) PROFILE CLAMP FOR CONNECTING TWO TUBULAR BODIES

(71) Applicant: NORMA Germany GmbH, Maintal (DE)

(72) Inventors: Belal Akremi, Newbury (GB); Tatjana Rumbauskiene, Newbury (GB); Mateusz Jarosz, Reading (GB)

(73) Assignee: Norma Germany GmbH, Maintal (DE)

( * ) Notice: Subject to any disclaimer, the term of this patent is extended or adjusted under 35 U.S.C. 154(b) by 24 days.

(21) Appl. No.: 17/925,386

(22) PCT Filed: Apr. 20, 2021

(86) PCT No.: PCT/EP2021/060159
§ 371 (c)(1),
(2) Date: Nov. 15, 2022

(87) PCT Pub. No.: WO2021/228505
PCT Pub. Date: Nov. 18, 2021

(65) Prior Publication Data
US 2023/0184358 A1 Jun. 15, 2023

(30) Foreign Application Priority Data
May 15, 2020 (DE) .................. 10 2020 113 297.2

(51) Int. Cl.
*F16L 23/08* (2006.01)
*F16B 2/08* (2006.01)
(Continued)

(52) U.S. Cl.
CPC ............. *F16L 23/08* (2013.01); *F16B 2/08* (2013.01); *F16L 23/036* (2013.01); *F16L 23/04* (2013.01)

(58) Field of Classification Search
CPC ....... F16L 23/08; F16L 23/036; F16L 23/032; F16L 23/04; F16L 23/20; F16L 23/10; F16B 2/08
See application file for complete search history.

(56) References Cited

U.S. PATENT DOCUMENTS 4,109,350 A * 8/1978 Acre .................. F16B 2/08
5,459,906 A * 10/1995 Detable
(Continued)

FOREIGN PATENT DOCUMENTS

| EP | 2674656 B1 | 8/2016 |
| JP | 2016186314 A | 10/2016 |
| WO | WO-2020119857 A1 * | 6/2020 |

OTHER PUBLICATIONS

JP 2016186314—Machine Translation—English (Year: 2016).*
(Continued)

*Primary Examiner* — William S. Choi
(74) *Attorney, Agent, or Firm* — REISING ETHINGTON, P.C.

(57) ABSTRACT

The disclosure relates to a profile clamp for connecting two tubular bodies wherein: the profile clamp has a clamp band having a profile cross-section that is open on the radially inner side; the clamp band, at at least one end, has a first transition portion and an adjoining, radially protruding clamping portion; and the clamping element can be clamped in the circumferential direction in order to tighten the profile clamp. A width of a base of the profile cross-section evenly increases from the end of the first transition portion facing away from the clamping element to the clamping element.

6 Claims, 3 Drawing Sheets

(51) Int. Cl.
  *F16L 23/036*   (2006.01)
  *F16L 23/04*    (2006.01)

(56) References Cited

U.S. PATENT DOCUMENTS

| | | | |
|---|---|---|---|
| 5,815,892 A * | 10/1998 | Geppert | ............... F16L 23/04 |
| 9,151,422 B2 | 10/2015 | Kayacik et al. | |
| 10,890,284 B2 | 1/2021 | Ghirardi et al. | |
| 2007/0176425 A1* | 8/2007 | Ma | ....................... F16L 23/08 |
| 2019/0211954 A1 | 7/2019 | Green | |
| 2021/0033227 A1 | 2/2021 | Ignaczak | |

OTHER PUBLICATIONS

WO-2020119857-A1—Machine Translation—English (Year: 2020).*
Japanese Office Action for Japanese Application No. 2022-568432 dated Nov. 21, 2023 (4 pages).
English Translation of Japanese Office Action for Japanese Application No. 2022-568432 dated Nov. 21, 2023 (5 pages).
German Office Action for German Application No. 10 2020 113 297.2 dated Jan. 15, 2021 (4 pages).
International Search Report for International Application No. PCT/EP2021/060159 dated Jun. 29, 2021 (3 pages).
English Translation of International Search Report for International Application No. PCT/EP2021/060159 dated Jun. 29, 2021 (2 pages).
Korean Office Action for Korean Application No. 10-2022-7039843 dated May 30, 2024 (6 pages).
English Translation of Korean Office Action for Korean Application No. 10-2022-7039843 dated May 30, 2024 (5 pages).

* cited by examiner

C-C

D-D

E-E

M-M

F-F

G-G

H-H

K-K

B-B

PROFILE CLAMP FOR CONNECTING TWO TUBULAR BODIES

INTRODUCTION

The disclosure relates to a profile clamp for connecting two tubular bodies.

Profile clamps are usually used to connect two pipes or similar bodies to one another. The profile clamp usually has a clamp band which has a profile cross section open on one side. This is intended to be placed radially from the outside onto the flanges which are in contact with one another. By means of a clamping head or the like, tightening is carried out in the circumferential direction, with the result that the profile clamp holds the two ends of the tubular bodies together in a form-locking and force-locking manner. Such profile clamps can be produced from a metallic material and can be suitable for high temperatures.

It may be necessary to guide the profile clamp, with the clamping head completely open, to the flanges to be connected to one another in order then to reassemble the clamping head and to tighten it accordingly. This is a separate working step and makes the installation of such profile clamps complicated.

EP 2 674 656 B1 shows, for example, a profile clamp having two profile half-shells which can be separated from one another at one end and a hinge situated between them.

SUMMARY

An object according to an embodiment is to provide a profile clamp which is simpler to install and at the same time as simple to manufacture as possible.

The proposal is for a profile clamp for connecting two tubular bodies, wherein the profile clamp has a clamp band having a profile cross section open radially on the inside, wherein the clamp band has a first transition section at at least one end and an adjoining, radially projecting clamping element, and wherein the clamping element can be clamped in the circumferential direction in order to tighten the profile clamp. According to an embodiment, it is envisaged that the width of a base of the profile cross section increases uniformly toward the clamping element from the end of the first transition section remote from the clamping element.

The shape of the profile clamp is substantially determined by the clamp band. In some embodiments, this could also have two clamp sections which are connected to one another in an articulated manner.

To tighten the profile clamp in the circumferential direction, two clamping elements can be provided, which together form a clamping head. The clamping elements can be implemented as clamping jaws or in other variants. The two clamping elements do not necessarily have to be implemented in an identical manner; they merely have to make it possible to introduce force in the circumferential direction. As a result of the tightening in the circumferential direction, the two clamping elements are brought closer to one another, so that, as a result of the tightening, the overall circumference of the profile clamp is reduced.

The profile clamp is preferably produced from a metallic material by a forming process, per an embodiment. The workpiece could be, for example, a material strip which is deep drawn and/or bent over in order to form the profile clamp or at least one half of the profile clamp. In this case, the clamping elements, the first transition sections and the clamp sections are designed as one coherent component. The first transition sections are intended to allow a shape transition between an open profile cross section of the relevant clamp section and a clamping element.

The profile cross section has a base which closes the profile cross section toward a radial side. It is conceivable that a plane of symmetry extends centrally through the base and that the profile cross section of the clamp sections is symmetrical with respect to this plane of symmetry. Different profile cross sections are conceivable which, in addition to V cross sections and U cross sections, can also include others. In this arrangement, the base always lies radially on the outside.

A feature of the profile clamp according to an embodiment is now that the width of the base increases uniformly toward the outside in the first transition section. If, for example, the tubular bodies to be connected each have a flange situated radially on the outside, such a flange can be guided more easily into the profile clamp in the vicinity of the clamping head. It is then possible that, although the clamping head must be slackened, it does not have to be completely disassembled. A maximum clear width in the clamp band is increased without modifying the external shape of the profile clamp. Owing to the simplified insertion, a sealing ring or the like could also be placed directly in the profile clamp at the same time, thus making assembly significantly easier overall. Moreover, it is possible to optimize material flow during the forming process since, with a uniformly increasing width, there are no abrupt curvature transitions which could lead to local thinning out or even a risk of fracture during work hardening. Accordingly, the first transition section is configured in a manner suitable for deformation and can improve the material properties after the deformation process.

In an embodiment, a height of the profile cross section decreases continuously toward the clamping element from the end remote from the clamping element. As a result, a further improvement is achieved, per an embodiment, with regard to assembly since the maximum clear distance between the first transition section and a joint section is thereby further increased. The continuous decrease need not necessarily be equated with a uniform decrease. Rather, a continuous, steady transition between the heights of the individual local profile cross sections is provided.

The profile cross section is preferably trough-shaped and has two legs, per an embodiment, which enclose the base and each have a straight section adjacent to the base, wherein the straight sections of the two legs enclose a first angle with respect to one another which increases continuously toward the clamping element from the end remote from the clamping element. The trough shape is delimited on a radially outer side by the base. To the side of the base, wall surfaces are provided which form the said legs in the profile cross section. It is conceivable that the legs do not directly adjoin the base at an angle but merge into the base via a rounded portion in a region close to the base. The placement of the profile clamp is also further improved, per an embodiment, by a continuous enlargement of the first angle. Here, too, the first angle does not necessarily have to decrease uniformly, but at least a continuous, steady progression should be present.

It is furthermore conceivable for the profile cross section to have two opposite end edges, the tangents of which enclose a second angle with respect to one another, which is in a range from 0° to 180°. The abovementioned wall surfaces of the trough-shaped profile cross section consequently have outwardly projecting overhangs. In some embodiments, the second angle could be approximately 90°, resulting in an opening angle of approximately 45°, into which a flange can be inserted, on each side of the profile cross section. In other embodiments, however, it is also possible to completely dispense with a second angle.

It is furthermore conceivable for the second angle to be substantially constant in the first transition section. The entire first transition section can therefore provide the same convenient opening angle.

In an embodiment, the clamp band has two curved clamp sections, which are connected to one another in an articulated manner. These can each be equipped with a clamping element and a first transition section. For the articulated connection, it is possible to use several different variants, which are not intended to limit the subject matter herein. For example, the two clamp sections can be implemented in the form of two half-shells, which are connected to one another via a hinge or a similar joint. As an alternative to this, it would also be possible for just a single elastically designed, band-type element to function as a connection between the two clamp sections, providing sufficient flexibility for opening and closing the profile clamp on account of its material properties.

As a particular preference, the clamp sections each have a second transition section remote from the first transition section, wherein the two second transition sections enclose a joint section, and wherein a height of the profile cross section in the second transition section decreases continuously in the direction of the joint section. The second transition sections in the region of the joint are not the primary dimension for the tightening of flanges. This embodiment can provide the greatest possible clear width in the interior of the profile clamp, per this embodiment, which can be used for fitting onto a flange. A low profile height as well as a high profile width can allow improved assembly despite a constant outside diameter of the profile clamp.

The width of the base could be constant in the second transition section. In particular, the continuously decreasing height is decisive for this and a base width can be kept constant. Thus, the profile clamp could be provided with an increasing width, which leads into a wider clamping head, only in a region around the clamping head. The width of the profile cross section can remain the same at all other points without having to dispense with the advantages according to various embodiments.

BRIEF DESCRIPTION OF THE FIGURES

Further features, details and advantages of the invention can be derived from the wording of the claims and from the following description of exemplary embodiments with reference to the drawings. In the drawings:

DETAILED DESCRIPTION

Figure 1:
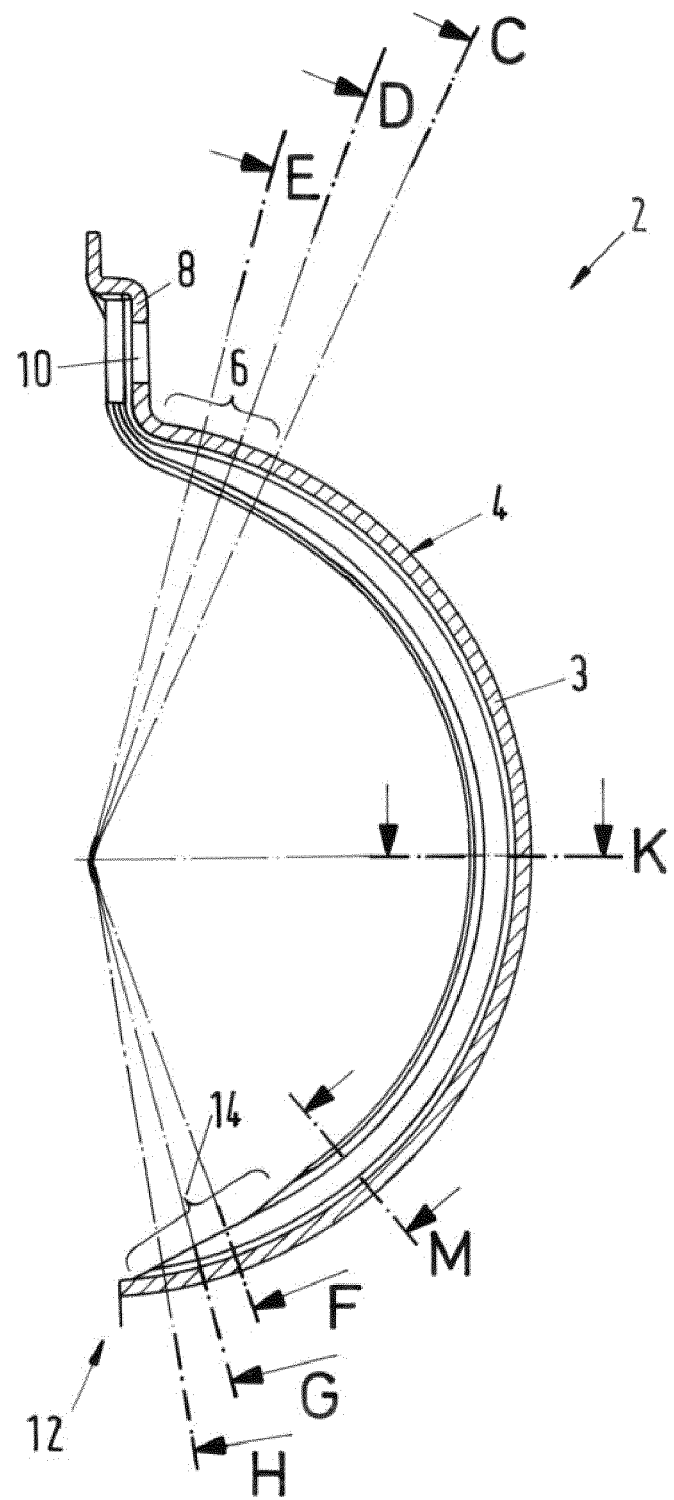
FIG. 1 shows a sectional illustration of one half of a profile clamp.

FIG. 1 shows one half of a profile clamp 2 for connecting two tubular bodies which, for example, each have a flange projecting radially outward at their ends to be connected, in a sectional illustration. Another, complementary half gives a complete profile clamp 2. The features referred to the illustrated half can also be present in the other half. In the following description, reference is made to features which relate to the entire profile clamp 2.

The profile clamp 2 has a clamp band which is formed by two clamp sections 4, which each have a first transition section 6 and an adjoining clamping element 8. Of course, it is also possible for the clamp band to be just a single piece. The clamping element 8 projects radially outward from the clamp section 4 and has a through-hole 10. A clamping device, for example a screw or something similar, can be guided through the through-holes 10 of the two clamping elements 8 and serves to tighten the profile clamp 2 in the circumferential direction. As a result, the clamping elements 8 can approach one another and possibly touch one another. A joint section 12 serves to connect the two clamp sections 4 to one another in an articulated manner in order to make possible a variable distance between the clamping elements 8 and thus enable tightening.

The first transition section 6 converts a uniformly curved shape of the respective clamp section 4 into a widened shape, to which the clamping element 8 is connected. One feature of the first transition section 6, per an embodiment, is the advantageous progression of the change in shape of the profile cross section, as will be explained in greater detail in the following figures.

Figure 2A:
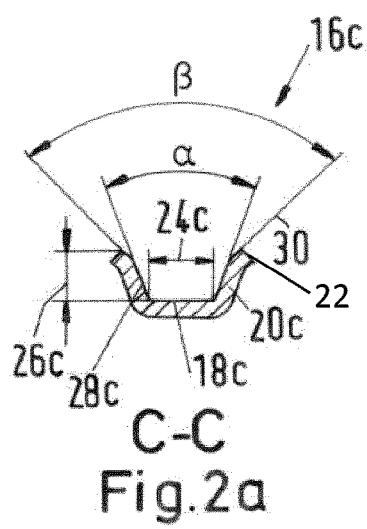
FIGS. 2a to 2c show several sectional illustrations of profile cross sections in a first transition section.
Figure 2B:
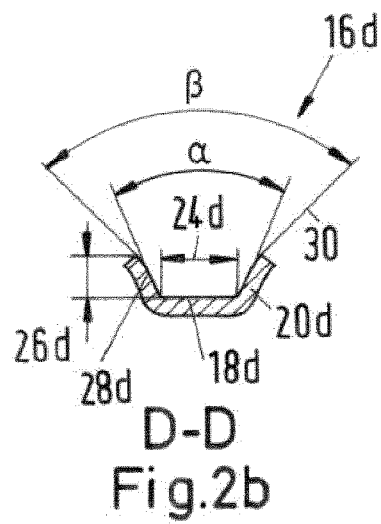
Figure 2C:
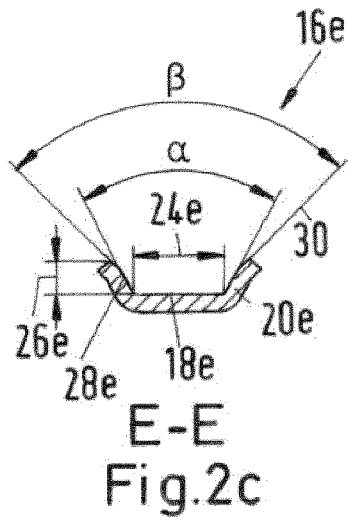
Figure 3A:
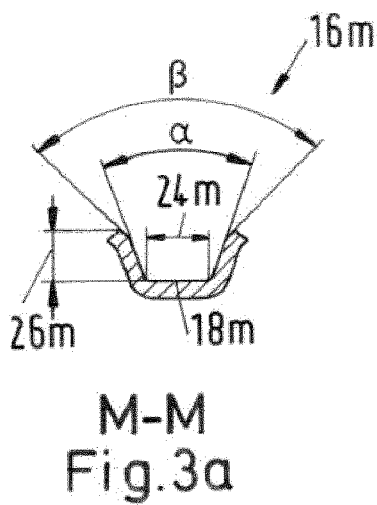
FIGS. 3a to 3d show several sectional illustrations of profile cross sections in a second transition section.
Figure 3B:
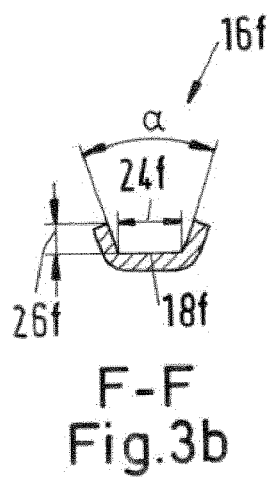
Figure 3C:
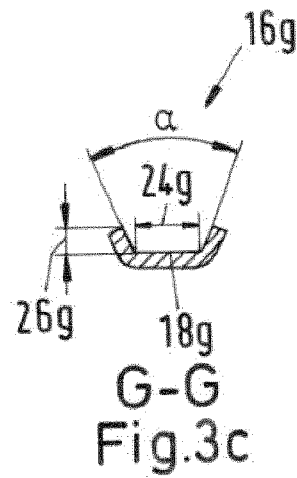
Figure 3D:
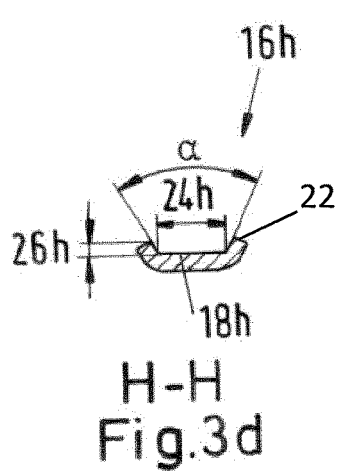

In FIG. 1, three profile section planes C, D and E are indicated in the first transition section 6, these being shown in FIGS. 2a to 2c. FIG. 1 shows that the heights of the local profile cross sections decrease in the direction of the clamping element 8. In the region adjacent to the joint section 12, there is a second transition section 14. There, three profile section planes F, G and H are likewise indicated. In the associated local profile cross sections, the heights decrease in the progression toward the joint section 12.

As a result, the greatest possible clear width can be provided at certain points between the joint section 12 and the first transition section 6, enabling a relaxed profile clamp 2 to be fitted onto a flange. Preferably, per an embodiment, the aforementioned element for tightening the clamping elements 8 is already arranged in the corresponding through-holes 10 and loosely screwed in. Therefore, the assembly effort for the profile clamp 2 is significantly less than in the case of known profile clamps.

FIGS. 2a to 2c show a progression of the shape of local profile cross sections 16 in the first transition section 6 from the clamp section 4 in the direction of the clamping element 8. Each of the profile cross sections 16 is of trough-shaped design and has a base 18 and two legs 20 enclosing the base 18. The legs 20 have mutually opposite end edges 22 remote from the base 18. The reference signs belonging to the individual profile cross sections 16 each have an additional letter for the assignment of the individual section planes, which letter correlates with the respective section plane. Consequently, FIGS. 2a to 2c show profile cross sections 16c, 16d and 16e, which have the base 18c, 18d and 18e, respectively, etc.

The local profile cross section 16c shown in FIG. 2a in the first transition section 6 is furthest away from the clamping element 8. The base 18c arranged there has a first width 24c. The profile cross section 16d arranged in section plane D has a base 18d with a width 24d which is greater than the width 24c of the previous profile cross section 16c. However, profile cross section 16e has a base 18e which has a width 24e which is even greater than the width 24d of the previous profile cross section 16d. At the same time, the three profile cross sections 16c, 16d and 16e have local heights 26c, 26d and 26e which become continuously smaller in the direction of the clamping element 8.

As can furthermore be seen in FIGS. 2a to 2c, straight sections 28c, 28d and 28e of the legs 20 enclose a first angle α, which likewise increases in the direction of the clamping element 8. It rises, for example, from about 38.5° to about 54.5°. In the intermediate profile cross section 16d, the first angle α can be, for example, 46.5°. Tangents 30 at the end edges 22, which each have an overhang, enclose a second angle β with respect to one another. This is, by way of example, constant at about 90° for all the profile cross sections 16c, 16d and 16e.

This change in shape of the local profile cross sections makes it easier for the profile clamp 2 to be placed on a flange of a tubular body to be connected. Furthermore, particularly during deep drawing or other forming processes, a more harmonious flow of force and material can be achieved, protecting the material to be formed and preventing cracks, fractures or step changes in the thickness of the material.

FIGS. 3a to 3d show changes in the shape of profile cross sections 16 in the region of the second transition section 14. Here, the shape changes from a normal profile cross section 16m to profile cross sections 16f, 16g and 16h. Here, the reference signs are used analogously to FIGS. 2a to 2c. It can be that the first angle α is likewise enlarged in the direction of the joint section 12. Here too, it could change from 38.5° to 54.5°. Here, the end edges 22 of the profile cross sections 16f, 16g and 16h are formed without an overhang, and therefore the second angle β located in profile cross section 16m disappears in the second transition section 14. Furthermore, the widths 24f, 24g and 24h of the bases 18f, 18g and 18h remain constant. In the second transition section 14, a pronounced flattening of the profile cross section 16 can be tolerated, and this leads to the large clear width between the two transition sections 6 and 14, which can be seen in FIG. 1.

Figure 4:
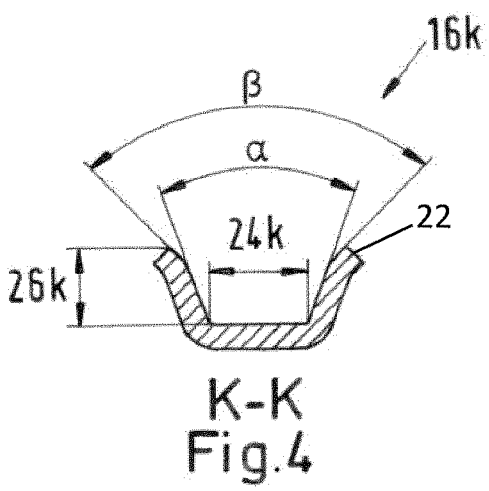
FIG. 4 shows a sectional illustration of a profile cross section in a clamp section.

The profile cross section 16k which is illustrated in FIG. 4 is located approximately centrally in the clamp section 4. It corresponds substantially to the profile cross section 16m in FIG. 3a and extends over the entire clamp section 4 between the two transition sections 6 and 14. The profile cross section 16m is designed to fit around flanges.

Figure 5A:
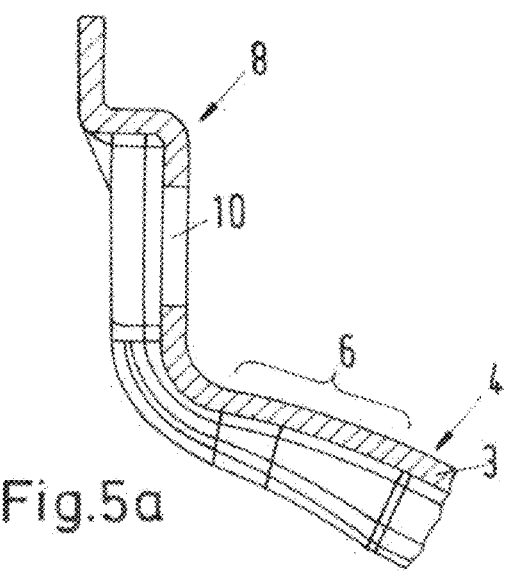
FIGS. 5a to 5c show detail illustrations of a clamping element.
Figure 5B:
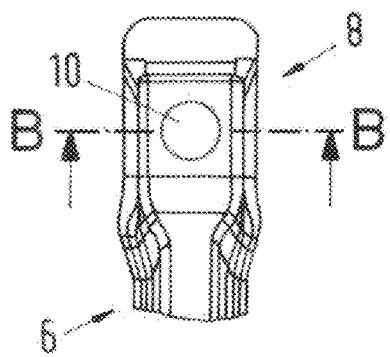
Figure 5C:
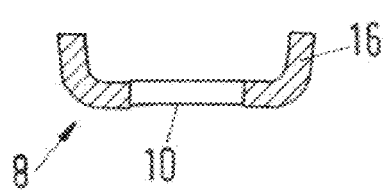
Figure 6A:
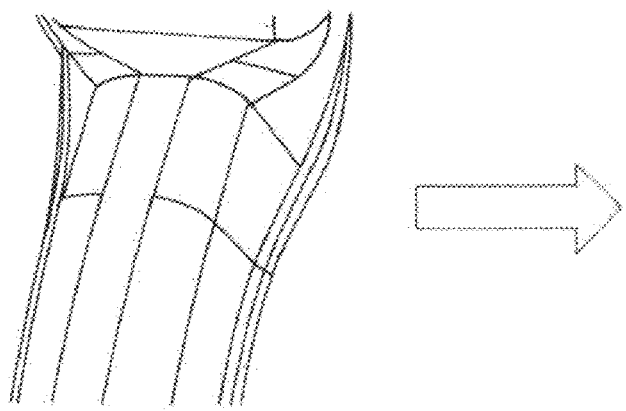
FIG. 6a shows a three-dimensional illustration of a prior art transition to a clamping element.
Figure 6B:
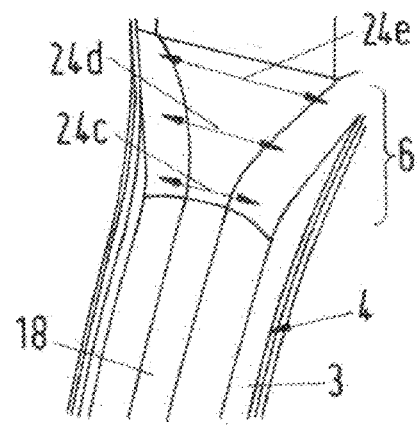
FIG. 6b shows a three-dimensional illustration of a transition to a clamping element according to one embodiment of the disclosure.

FIGS. 5a, 5b, and 5c show the clamping element 8 in two detail view and a cross section. FIG. 5a clearly shows the decreasing height of the profile cross section 16. FIG. 5b, for its part, shows the uniform widening of the base 18. This can furthermore be seen in FIG. 6a-b wherein FIG. 6a shows a conventional connection region of a clamping element (left-hand part of FIG. 6) and the configuration according to an embodiment is seen in FIG. 6b. In the latter, the advantageous, uniform increase in width for optimizing the flow of material and force can be seen.

The invention is not restricted to one of the above-described embodiments but can be modified in a variety of ways.

All the features and advantages which emerge from the claims, the description and the drawing, including design details, spatial arrangements and method steps, may be essential to the invention either per se or in a wide variety of combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 2 profile clamp
3 clamp band
4 clamp section
6 first transition section
8 clamping element
10 through-hole
12 joint section
14 second transition section
16 profile cross section
18 base
20 leg
22 end edge
24 width of the base
26 height of the profile cross section
28 straight section
30 tangent
α first angle
β second angle

The invention claimed is:

1. A profile clamp for connecting two tubular bodies, wherein the profile clamp comprises a clamp band having a profile cross section open radially on an inside,
wherein the clamp band has two curved clamp sections, which are connected to one another in an articulated manner, the two clamp sections each having a first transition section partially located at one end of a circumferential direction and an adjoining, radially projecting clamping element, and
wherein the profile clamp can tighten the tubular bodies by bringing each of the clamp sections closer to one another in the circumferential direction,
wherein a width of a base of the profile cross section increases uniformly toward the clamping element of one of the two clamp sections from the end of the corresponding first transition section remote from the clamping element,
wherein tangents of edges of inner surfaces on both sides of a width direction of the profile cross section over an entire circumferential length of the first transition section are angled relative to each other at a constant second angle, wherein the second angle is approximately 90°, resulting in an opening angle of approximately 45°, into which a flange can be inserted, on each side of the profile cross section, wherein the second angle is substantially constant in the first transition section.

2. The profile clamp as claimed in claim 1, wherein a height of the profile cross section decreases continuously toward the clamping element from the end remote from the clamping element.

3. The profile clamp as claimed in claim 1, wherein the profile cross section is trough-shaped and has two legs, which enclose the base and each have a straight section adjacent to the base,
  wherein the straight sections of the two legs enclose a first angle with respect to one another which increases continuously toward the clamping element from the end remote from the clamping element.

4. The profile clamp as claimed in claim 3, wherein the second angle is the same as the first angle.

5. The profile clamp as claimed in claim 1, wherein the clamp sections each have a second transition section partially located circumferentially remote from the first transition section, respectively, wherein the two second transition sections enclose a joint section, and
  wherein a height of the profile cross section in each of the second transition sections decreases continuously in the direction of the joint section.

6. The profile clamp as claimed in claim 5, wherein the width of the base is constant in each of the second transition sections.

* * * * *